United States Patent Office 3,420,288
Patented Jan. 7, 1969

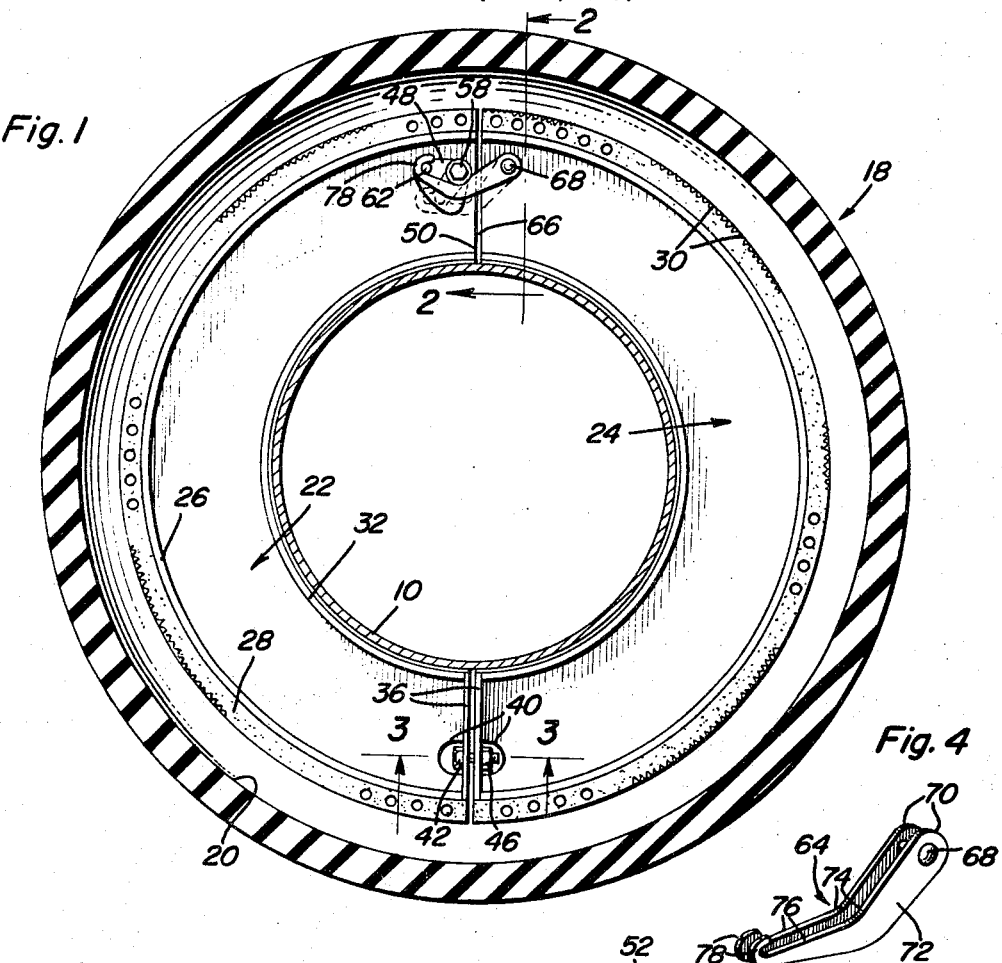

---

3,420,288
INTERNAL SAFETY WHEEL FOR PNEUMATIC TIRES
Ernest A. Unruh, 2021 N. Main, Newton, Kans. 67114
Filed Apr. 8, 1966, Ser. No. 541,378
U.S. Cl. 152—158                    5 Claims
Int. Cl. B60c 17/04

ABSTRACT OF THE DISCLOSURE

The built-in safety wheel shown will function only on a drop-center vehicle wheel rim equipped with a tubeless tire and wherein the web of the rim is imperforate. It is such in construction that it will allow a vehicle with tire trouble to continue movement at a reasonably safe speed for a distance of 50 miles, more or less. It will minimize, even eliminate, roadside tire changing, will reduce hazards and accidents to an acceptable minimum and overcome the likelihood of being assaulted on a lonely highway. In fact, this invention is resourceful, feasible and possessed of the capability of doing away with the prevailing practice of having to carry a spare wheel.

---

This invention relates to a conventional-type vehicle wheel embodying an annular drop-center channel, bounded by left and right tire bead seating and confining endless flanges, a regular pneumatic tubeless tire casing, and the combination therewith of an improved safeguarding load bearing wheel encompassing and clampingly mounted on the web of the drop-center channel, and characterized by a uniquely novel sectional wheel equipped with an encircling semisolid tire and which comes into play in the event the tire casing is deflated from a puncture, blowout or leakage, as the case may be.

Persons conversant with the wheel and tire art are aware of the overall problem. Accordingly, many and varied patents have been issued in an effort to cope with and solve the same. The fact that such prior art devices have not, or so it would seem, met with widespread adoption and use is persuasive if not conclusive that the problem remains unsolved. It follows that the object of the instant endeavor is to provide a more suitable and reliable internal safety load bearing wheel which can be endorsed for practical use and which is destined, it is submitted, to meet with manufacturing requirements and economies of manufacturers, approval of wheel and tire wholesalers and retailers, and which will qualify for acceptable use by all persons concerned with feasible aids to implement safe driving of motor vehicles.

There are many reasons for the proposed use of built-in safety wheels too numerous to dwell upon here but set forth in detail in Patent 2,040,645, issued to Dickinson. Generally stated, the invention herein disclosed will allow a vehicle with a deflated tubeless tire to continue driving at a reasonably safe speed for a distance (perhaps in excess of 50 miles) and with reasonably skillful handling and care, it will not seriously damage the casing. It will allow a vehicle having tire trouble, on a freeway, for example, to continue driving until a garage or service station is safely reached. It will minimize, perhaps eliminate, the need for roadside tire changing and reduce the risk of being struck by another car or being assaulted on a lonely highway or road. Then, too, the invention is possessed of such capabilities that one can visualize the possibility of not having to carry a spare tire or wheel, thus allowing for better utilization of the storage space in the vehicle's trunk.

The herein revealed device will function only on a drop-center rim equipped with a regular pneumatic tubeless tire or casing. Anyone experienced in the art of changing tires can install the device. There are at least two important features. One is an over-center cam-type linkage fastener for the dual section rim structure which is such in construction that it can be actuated (loosened or tightened) by an appropriate socket wrench. The other featured improvement has to do with the narrow and offset design of the inner ring of the sectional rim structure which is seated in the channel of the drop-center of the wheel rim. This offset is deemed necessary to allow the casing to be mounted after the safety load bearing wheel or device has been installed. To the ends desired, it is desirable to pre-fit and properly adjust the device prior to mounting the tire.

Briefly, but more specifically recited, the overall concept has to do with a conventional-type vehicle wheel rim embodying a drop-center component or channel and endless circumferential tire bead locating and retaining flanges to the left and right, respectively, of said drop-center channel. It will be noted in this connection that the vehicle wheel rim is intact and that the web of the drop-center portion is imperforate to guard against air leakage. A conventional tubeless pneumatic tire casing encompasses the wheel rim and has its side wall beads mounted and held in place by the retaining flanges on the rim. The improved safety-type load bearing means is confined, of course, within the limits of the air chamber of the tire casing. This means is characterized by a wheel embodying an annular rim which encircles and is securely mounted in the channel of the drop-center portion. The rim is I-shaped in transverse cross-section and embodies an inner ring, an outer ring and an intervening web which rigidly unites the rings in concentric relationship. The outer ring is spaced a predetermined distance inwardly from the interior wall of the tread portion of the tire casing. It is also provided around its outer peripheral surface with a semisolid rigidly attached inner tire which has an antiskid traction tread properly spaced from the interior wall and adapted to cooperatively engage said wall upon deflation of the tire casing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view showing the tire and wheel rim in section and showing the interior or internal safety wheel and the component parts thereof in elevation and mounted for operative use;

FIGURE 2 is an enlarged cross-section taken on the plane of the vertical line 2—2 of FIGURE 1;

FIGURE 3 is a fragmentary detail section on an enlarged scale taken on the section line 3—3 of FIGURE 1;

FIGURE 4 is a view in perspective of one of the links of the linkage-type fastening means; and FIGURE 5 is a view in perspective of the cam-equipped companion link.

Referring now to the views of the drawing the conventional wheel rim (FIG. 2) is denoted by the numeral 8 and, as usual, is provided with a centralized endless annular drop-center portion 10 bordered on the left and right (FIG. 2) by seating and retaining flanges 12 for coacting beads 14 and 16 carried by the side walls of the conventional pneumatic tubeless tire casing 18. The interior peripheral surface of the tread of the tire casing is denoted at 20.

The attachable and detachable improved load bearing means comprises a wheel and tire enclosed within the confines of the air chamber of the tire as shown in FIGS. 1 and 2. This inner wheel comprises a pair of substantially duplicate semicircular half-sections one of which is denoted at the left in FIG. 1 by the numeral 22 and the other one at the right by the numeral 24. The adjacent and coacting lower ends (FIG. 1) are the same in construction and are separably and adjustably coupled together. Before describing the coupling means it is to be pointed out that each half-section is of I-shaped cross-section and comprises an outer ring 26 provided around its outer peripheral surface with a semisolid inner tire 28 having pyramidal or equivalent antiskid projections 30 on its tread portion. The inner ring 32 is of a cross-section significantly less than the cross-section of the ring 26 and also of a width much less than the width of the channel of the drop-center portion 10 in which it is seated. Thus, clearance space for the beads 14 and 16 is provided to the left and right of this inner ring 32 (FIG. 2). Both rings are joined by an appropriate web 34.

Referring now to the lower end portions in FIG. 1 and detailed in FIG. 3, it will be seen that suitable confronting lateral flanges are provided at 36, that coacting portions of the two flanges are provided with bolt holes 38 which register with each other and with slots 40 in the web portions. This construction serves to accommodate a bolt 42 whose screw-threaded shank 44 passes through the bolt holes and is held in assembling position by a nut 46. Thus, the bolt and nut coact with the slots 40 for accessibility in initially fitting and adjusting the overall sectional rim so that it can be clamped and fastened around the cooperating surface of the drop-center web 10 (FIG. 2).

Referring now to the upper end portion of the rim section 22, it will be seen that it is provided with a triangular opening 48 which is close to the terminal end 50 of the web and which is properly located to accommodate the cam-equipped link 52 (FIG. 5) of the linkage means. This is to say, the link 54 is fitted within the confines of the triangular opening and one end is rounded to provide a cam 56 which is seated and rockable in the vertex portion of the triangular opening 48. This end portion is provided on opposite sides with hexagonal projections 58 which provide tool grips for adjusting needs and which serve to accommodate a socket wrench of suitable size.

The left-hand end portion of the link 54 is preferably rounded as at 60 and this end portion is provided with axially aligned headed studs 62 which provide detents and which serve in a manner to be described. With reference now to the companion link of the linkage-type fastening means, this link is denoted by the numeral 64 (FIG. 4) and is of elongated fork-like construction. To accommodate this link 64 the terminal edge portion 66 of the web is provided with a properly positioned hole (not detailed) which provides a bearing for a pin 68 carried by the end portions 70 of the spaced parallel arms 72 of the fork or link. The median portions of the arms are bent as at 74 to provide seating means in which the aforementioned tool grips 58 are cradled in the manner shown in FIG. 1. The free left-hand oblique angled end portions 76 terminate in spaced parallel hooks 78 which are operatively engaged with the headed studs 62. Thus, the hooked ends 78 are oriented and coordinated with the headed studs or detents 62 in order to achieve the desired simultaneous dual action of the two links 52 and 64. The length of the fork arms is such that these arms straddle the adjacent terminal edges 50 and 66 of the webs and also bridge the triangular opening 48 and cooperate with the link 52. By merely connecting a socket wrench of appropriate size (not shown) with the available tool grip 58 and turning the wrench the link 52 swings in an arcuate path within the confines of the triangular opening 48, whereby to thus achieve the over-center locking result shown in full lines in FIG. 1.

Considering now the preferred mode and manner of use, the first step concerns taking a bare drop-center wheel rim, that is, one with the tire off; then properly fitting the half-sections of the attachable load bearing wheel in the available channel. The proper adjustment for adequate clamped retention is accomplished with the aid of the bolt and nut means which couples the flanged ends of the companion half-sections together. Next, the adjusted ready-to-use load-bearing wheel is removed and the first bead of the casing is mounted in a conventional manner. Then, the sections of the above-named wheel are inserted and secured in place, using the cam-equipped over-center linkage means (FIG. 1) to do so. Next, the remaining casing bead is placed in its intended position in the conventional manner. It is desired, perhaps necessary, to coat the latter bead with a suitable rubber lubricant to facilitate the step of stretching said bead over the edge of the solid tire-equipped outer ring or rim. The tightness encountered is due, of course, to enlargement brought about by the location of the inner ring seated in the channel of the drop-center of the wheel rim.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a conventional-type vehicle wheel rim embodying a wholly imperforate drop-center component defining the usual endless encircling annular channel and endless circumferential bead locating and retaining flanges to the left and right, respectively, of said drop-center channel, a conventional tubeless pneumatic tire casing encompassing said wheel rim with said beads mounted and held in place by said retaining flanges, and safety-type load bearing means located in the air chamber of said tire casing, said means comprising a wheel embodying an annular rim encircling and securely mounted in the channel of said drop-center component, said rim being I-shaped in transverse section and embodying an inner ring, an outer ring, and an intervening web rigidly uniting said rings in concentric relationship, said outer ring being spaced a predetermined distance inwardly from the interior wall of the tread portion of said tire casing and provided around its outer peripheral surface with a semisolid rigidly attached tire having an antiskid traction tread also spaced a prescribed distance from said interior wall and adapted to cooperatively engage said wall upon deflation of said tire casing, said inner ring being of a width appreciably less than the width of the web of said drop-center channel and superimposed upon and fixed to said channel web, the respective marginal edges of said inner ring being centered and spaced a prescribed distance inwardly from the respective circumferential side walls of the channel in a manner to provide ample clearance in said channel for the beads of said tire casing, whereby to permit one to mount said tire casing without undue interference or difficulty from or because of the presence of said inner ring in said channel, said safety load-bearing wheel comprising a pair of substantially duplicate semicircular companion half-sections having contiguous ends provided with opposed confronting flanges separably and adjustably coupled together by coacting bolt and nut means, the other ends of said half-sections being separably mechanically joined by linkage means.

2. The combination according to claim 1, and wherein said linkage means comprises a first link confined within the marginal limits of a triangular captive opening provided therefor in the web of one half-section proximal to the terminal end of said half-section, said first link having a cam at one end rockable in the coacting crotch-forming vertex portion of said opening, said one end also having integral outstanding accessible hexagonal manually actuatable wrench grips for a suitable socket wrench and for bodily swinging said link through an arcuate path from a released position to an over-center locking position, the other end of said link having detents projecting laterally outwardly and beyond the respective side surfaces of said web, and a complemental fork-type link having one end pivotally anchored on a terminal portion of the web of the other half-section, the levering arms of the fork straddling both webs, bridging the joint at the abutting ends of said webs, also straddling said first link with the latter sandwiched therebetween, and said arms having free ends provided with terminal hooks operatively engaged with their respectively oriented and coordinating detents, whereby when a wrench is manually applied to said first link and the detents and hooks are caused to pass dead-center, the desired locking action of the overall linkage means is accordingly accomplished.

3. The combination according to claim 2, and wherein the median portions of said fork arms are provided with hook offsetting bends defining and providing adapter seats in which said wrench grips are cradled for unimpeded functioning and locking of the linkage means.

4. A load bearing safety-type wheel adapted to be applied to and clamped around the web portion of a drop-center vehicle wheel within the confines of the air chamber of a tubeless tire casing comprising: a pair of substantially semicircular half-sections each of which is substantially I-shaped in cross-section, each half-section embodying inner and outer ring portions joined by an intervening connecting web, said outer ring portions provided with semi-solid tires having anti-skid traction treads, the inner ring portions being of a cross-sectional width significantly less than the cross-sectional width of the outer ring portions, one end of one half-section having a lateral terminal flange, the corresponding end of the other half-section likewise having a companion lateral terminal flange opposed to and confronting said first flange means clampingly adjustably joining said flanges and half-sections together, the other terminal ends of said half-sections abutting each other in end-to-end oriented alignment, and linkage means separably joining said abutting ends.

5. The combination of claim 4, and wherein said linkage means comprises a first link confined within the marginal limits of a triangular captive opening provided therefor in the web of one half-section proximal to the terminal end of said half-section, said first link having a cam at one end rockable in the coacting crotch-forming vertex portion of said opening, said one end also having integral outstanding accessible hexagonal manually actuatable wrench grips for a suitable socket wrench and for bodily swinging said link through an arcuate path from a released position to an over-ecnter locking position, the other end of said link having detents projecting laterally outwardly and beyond the respective side surfaces of said web, and a complemental fork-type link having one end pivotally anchored on a terminal portion of the web of the other half-section, the levering arms of the fork straddling both webs, bridging the joint at the abutting ends of said webs, also straddling said first link with the latter sandwiched therebetween, and said arms having free ends provided with terminal hooks operatively engaged wtih their respectively oriented and coordinating detents, whereby when a wrench is manually applied to said first link and the detents and hooks are caused to pass dead-center, the desired locking action of the overall linkage means is accordingly accomplished.

References Cited

UNITED STATES PATENTS

| | | | |
|---|---|---|---|
| 2,241,858 | 5/1941 | Hruska | 152—158 |
| 2,989,108 | 6/1961 | Gore | 152—158 |
| 3,142,326 | 7/1964 | Lindley | 152—158 |

ARTHUR L. LA POINT, *Primary Examiner.*

C. B. LYON, *Assistant Examiner.*